(12) United States Patent
Yokote (10) Patent No.: US 7,360,614 B2
(45) Date of Patent: Apr. 22, 2008

(54) STEERING CONTROL FOR DRIVE WHEELS OF VEHICLE

(75) Inventor: Masatsugu Yokote, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 281 days.

(21) Appl. No.: 10/849,181

(22) Filed: May 20, 2004

(65) Prior Publication Data
US 2004/0238238 A1 Dec. 2, 2004

(30) Foreign Application Priority Data
May 26, 2003 (JP) .............................. 2003-147648

(51) Int. Cl.
*B62D 5/04* (2006.01)
(52) U.S. Cl. ...................... 180/6.24; 180/6.5; 180/446; 701/41
(58) Field of Classification Search ................. 180/444, 180/446, 402, 403, 6.28, 6.48, 6.5, 411, 412, 180/428, 6.3, 6.44, 65.5, 30.8, 6.26; 701/41–43
See application file for complete search history.

(56) References Cited

U.S. PATENT DOCUMENTS

| 5,323,866 | A | * | 6/1994 | Simard et al. .............. 180/6.28 |
| 5,345,155 | A |   | 9/1994 | Masaki et al. |
| 5,469,928 | A | * | 11/1995 | Adler et al. ................ 180/6.28 |
| 5,996,725 | A | * | 12/1999 | Nishino et al. ............. 180/446 |
| 6,154,696 | A |   | 11/2000 | Nishi et al. |
| 6,219,604 | B1 | * | 4/2001 | Dilger et al. .................. 701/41 |
| 6,363,305 | B1 | * | 3/2002 | Kaufmann et al. ........... 701/41 |
| 6,370,460 | B1 | * | 4/2002 | Kaufmann et al. ........... 701/41 |
| 6,405,113 | B1 |   | 6/2002 | Yamawaki et al. |
| 6,505,703 | B2 | * | 1/2003 | Stout et al. .................. 180/446 |
| 6,580,989 | B1 | * | 6/2003 | Husain et al. ................ 701/41 |
| 6,597,975 | B1 | * | 7/2003 | Shinmura et al. ............. 701/48 |
| 6,635,454 | B1 | * | 10/2003 | Kossmann et al. ........... 435/98 |
| 6,678,597 | B2 | * | 1/2004 | Amberkar ..................... 701/41 |
| 6,687,588 | B2 | * | 2/2004 | Demerly et al. .............. 701/41 |
| 6,728,615 | B1 | * | 4/2004 | Yao et al. ..................... 701/41 |

(Continued)

FOREIGN PATENT DOCUMENTS

DE 10059689 A1 6/2001

(Continued)

OTHER PUBLICATIONS

"March, Manual for New-Model Car, Introduction of K12-series" Nissan Motor Co., Ltd., Feb. 2002.

*Primary Examiner*—Anne Marie Boehler
(74) *Attorney, Agent, or Firm*—Foley & Lardner LLP (57) ABSTRACT

In a vehicle, a pair of left and right drive wheels are linked with a steering input device so that the drive wheels are turned in accordance with a driver's steering input force input by a driver to the steering input device. In this course, a steering assistance force is added to the driver's steering input force. Driving forces to be applied to the drive wheels are individually controlled in accordance with a running condition of the vehicle. A steering reaction force is calculated which originates from a difference in the driving forces between the drive wheels and acts on the steering input device. The steering assistance force added to the driver's steering input force is increased or decreased so as to compensate the steering reaction force.

13 Claims, 7 Drawing Sheets

U.S. PATENT DOCUMENTS

| | | | |
|---|---|---|---|
| 6,736,236 B2 * | 5/2004 | Kurishige et al. | 180/446 |
| 6,856,871 B2 | 2/2005 | Mould et al. | |
| 6,871,715 B1 * | 3/2005 | Diaz Carmena et al. | 180/65.5 |
| 6,880,654 B2 * | 4/2005 | Plishner | 180/65.6 |
| 2003/0158642 A1 * | 8/2003 | Mould et al. | 701/41 |
| 2006/0015226 A1 | 1/2006 | Bernzen et al. | |

FOREIGN PATENT DOCUMENTS

| | | |
|---|---|---|
| DE | 10235039 A1 | 2/2004 |
| EP | 1331158 A1 | 7/2003 |
| JP | 59-141405 | 9/1984 |
| JP | 59-141405 U | 9/1984 |
| JP | 5-176418 A | 7/1993 |
| JP | 9-323561 A | 12/1997 |
| JP | 09323561 A | 12/1997 |
| JP | 11-129927 A | 5/1999 |

\* cited by examiner

| | | VEHICLE OPERATION | DRIVING FORCE | STEERING FORCE | ASSISTANCE FORCE |
|---|---|---|---|---|---|
| TURNING | OUTER WHEEL | IMPROVE YAWING RESPONSE | INCREASE | LIGHT | DECREASE |
| | | RESTRAIN YAWING RESPONSE | DECREASE | HEAVY | INCREASE |
| | INNER WHEEL | RESTRAIN YAWING RESPONSE | INCREASE | HEAVY | INCREASE |
| | | IMPROVE YAWING RESPONSE | DECREASE | LIGHT | DECREASE |
| STRAIGHT RUNNING | DRIVE WHEEL (LEFT/RIGHT) | (KEEP RUNNING STRAIGHT) | INCREASE/ DECREASE | FLUCTUATE | COMPENSATE |

STEERING CONTROL FOR DRIVE WHEELS OF VEHICLE

BACKGROUND OF THE INVENTION

The present invention generally relates to technique for steering a vehicle having at least a pair of individually driven right and left steerable wheels, and more particularly, to technique for preventing a steering reaction force originating from a difference between driving forces of the right and left wheels from imposing an adverse effect on a driver's steering operation.

Japanese Utility Model Application Publication No. S59 (1984)-141405 and Japanese Patent Application Publication No. H09(1997)-323561 disclose techniques for differentiating rotation speeds or driving forces of a pair of right and left drive wheels of a vehicle when the vehicle is turning, such as by controlling the drive wheels individually, or by correcting the driving forces of the left and right drive wheels individually in accordance with running conditions of the vehicle, so as to enhance turning characteristics of the vehicle.

SUMMARY OF THE INVENTION

In the above-mentioned techniques, the difference in the driving forces between the outer and inner wheels causes a steering reaction force which forces the driver to input an unnaturally heavy or light steering force to drive the vehicle in a desired turning radius or to hold the steering wheel at a desired steering angle.

It is an object of the present invention to provide steering technique for compensating a steering reaction force originating from a difference in driving forces between a pair of right and left steerable wheels of a vehicle to prevent an undesired steering operation.

According to one aspect of the present invention, a steering apparatus for controlling left and right drive wheels of a vehicle, including: a driving force control section to control left and right driving forces of the left and right drive wheels individually in accordance with a running condition of the vehicle; a power assistance device to add a steering assistance force to a driver's steering input force input to a steering input device; a steering mechanism to link the left and right drive wheels with the steering input device so that the left and right drive wheels are turned in accordance with the driver's steering input force and the steering assistance force added thereto; a steering reaction force calculating section to calculate a steering reaction force acting on the steering input device in accordance with a difference between the left and right driving forces; and a steering force correcting section to correct the steering assistance force so as to compensate the steering reaction force.

The other objects and features of this invention will become understood from the following description with reference to the accompanying drawings.

DETAILED DESCRIPTION OF THE INVENTION

Figure 1:
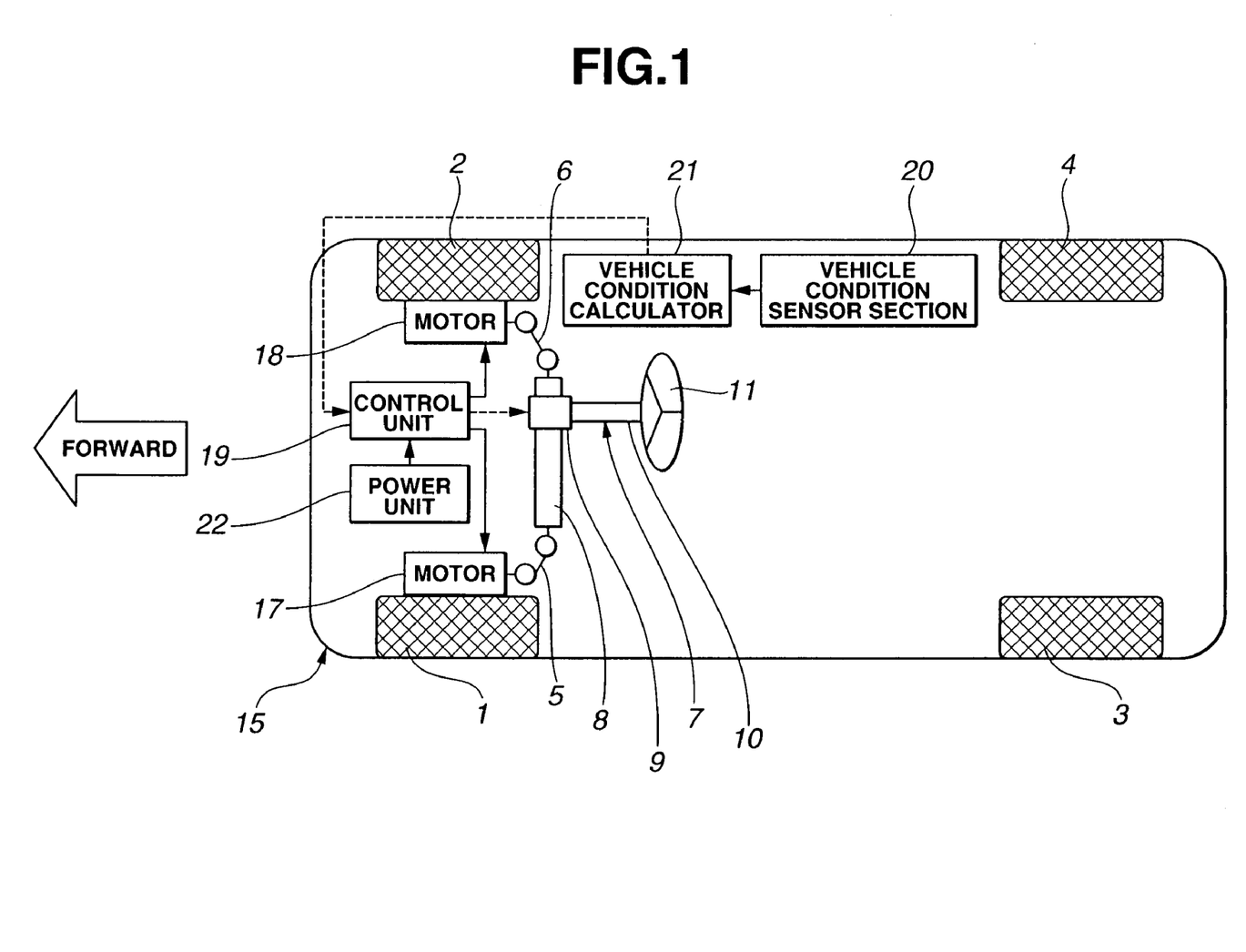
FIG. 1 is a schematic plan view showing a vehicle equipped with a steering apparatus for controlling drive wheels according to an embodiment of the present invention.

FIG. 1 shows a vehicle equipped with a steering apparatus for controlling drive wheels according to an embodiment of the present invention. The vehicle of this example is an electric vehicle 15 having front left and right wheels 1 and 2 and rear left and right wheels 3 and 4. The steering system of vehicle 15 includes a rack-and-pinion steering mechanism 7 including a rack 8. The left end of rack 8 is connected through a side rod 5 with an axle member of left front wheel 1. The right end of rack 8 is connected through a side rod 6 with an axle member of right front wheel 2.

When a driver turns a steering wheel 11 as a steering input device, by inputting a driver's steering input force thereto, the driver's steering input force is transmitted via a steering shaft 10 and rack-and-pinion steering mechanism 7 to side rods 5 and 6 so that side rods 5 and 6 are pushed out and pulled in, or pulled in and pushed out, in a widthwise direction of vehicle 15. The steering system further includes a power assistance device (servo unit) 9. As power assistance device 9, it is possible to employ an electric power steering mechanism explained in "MARCH, Manual for New-Model Car, Introduction of K12-series" published on February 2002 by Nissan Motor Co., Ltd., the entire contents of which are hereby incorporated by reference. In the course of transmitting the driver's steering input force, a steering assistance force is added to the driver's steering input force by power assistance device 9.

The drive system of vehicle 15 includes a driving electric motor (a wheel motor) 17 connected with front left wheel 1, for driving front left wheel 1 exclusively; and a driving electric motor (a wheel motor) 18 connected with front right wheel 2, for driving front right wheel 2 exclusively. A power unit 22 supplies power to motors 17 and 18. Each of motors 17 and 18 receives an output command from a control unit 19, and drives front wheel 1 or 2.

Figure 2:
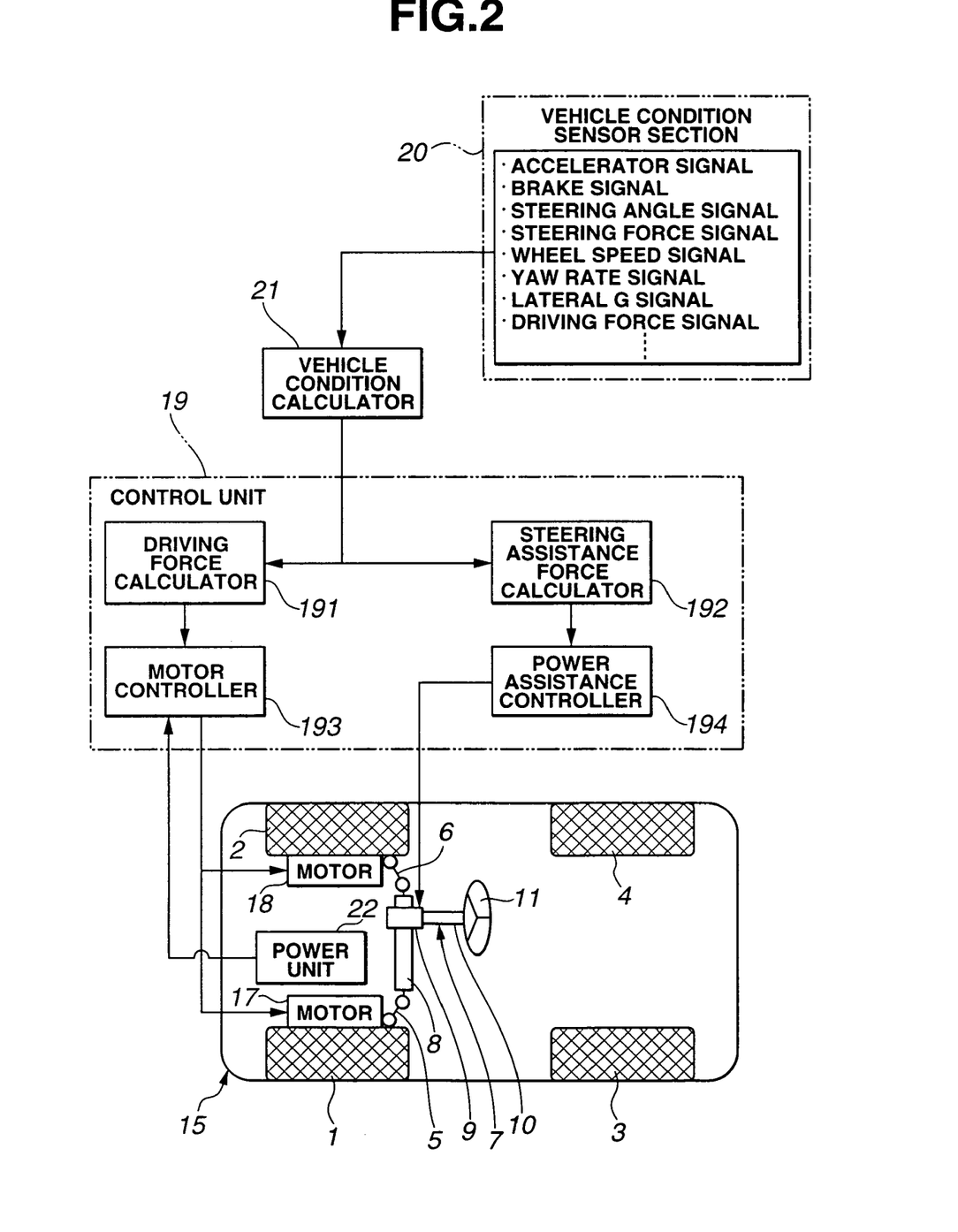
FIG. 2 is a block diagram illustrating a control system of the steering apparatus of FIG. 1.

The control system of vehicle 15 includes a vehicle condition sensor section 20, a vehicle condition calculator 21 and control unit 19. Vehicle condition sensor section 20 includes various sensors sensing conditions, such as an accelerator pedal operation, a brake operation, a steering angle and a driver's steering input force of steering wheel 11, rotating speeds of wheels 1 to 4, a yaw rate and a vehicle widthwise gravitational acceleration (lateral G, lateral acceleration); converts the sensed conditions to signals; and transmits the signals to vehicle condition calculator 21. Vehicle condition calculator 21 calculates running conditions (vehicle conditions) of vehicle 15, such as a condition indicating that vehicle 15 is running substantially straight or a condition indicating that vehicle 15 is turning substantially steadily; converts the calculated running conditions to vehicle condition signals; and transmits the vehicle condition signals to control unit 19. In accordance with the received vehicle condition signals, especially in accordance with a signal representing the accelerator opening (degree)

based on the accelerator pedal operation, and with signals representing the rotating speeds of the wheels, control unit 19 calculates desired rotating speeds and desired driving forces for front wheels 1 and 2, and provides motors 17 and 18 with driving-force commands for achieving the desired rotating speeds and the desired driving forces. When necessary, control unit 19 provides power assistance device 9 with a signal for increasing or decreasing the steering assistance force for steering wheel 11. FIG. 2 is a block diagram illustrating the above-described control system.

As shown in FIG. 2, control unit 19 includes a driving force control section for controlling the drive system and a steering control section for controlling the steering system. The driving force control section for controlling the drive system includes a driving force calculator (or calculating section) 191 and a motor controller (or controlling section) 193. Driving force calculator 191 calculates the left driving force of the front left drive wheel 1 and the right driving force of the front right drive wheel 2 in accordance with the vehicle condition signals. Motor controller 193 controls motors 17 and 18 to achieve the calculated left and right driving forces.

The steering control section for controlling the steering system includes a steering assistance force calculator (or calculating section) 192 and a power assistance controller (or controlling section) 194. Steering assistance force calculator 192 calculates the steering assistance force in accordance with the steering angle input to steering wheel 11. Power assistance controller 194 controls the power assistance device (servo unit) 9 to achieve the calculated steering assistance force.

Hereinbelow, more detailed descriptions will be given regarding the drive system, the steering system and the control system of the vehicle equipped with the steering apparatus according to the present embodiment.

First, a description will be given in detail regarding the section for controlling the drive system. In order to generate the left and right driving forces for left and right front wheels 1 and 2, vehicle condition calculator 21 calculates a speed of turning vehicle 15 in accordance with the rotating speeds of wheels 1 to 4 sensed by respective rotating speed sensors included in vehicle condition sensor section 20; driving force calculator 191 of control unit 19 calculates a desired rotation speed difference between the front wheels 1 and 2 in accordance with the steering angle of the steering wheel 11, vehicle specification data items and other vehicle conditions; and in accordance with results of the calculation, motor controller 193 controls motors 17 and 18 to generate the left and right driving forces for left and right front wheels 1 and 2, as disclosed in the above-mentioned Japanese Utility Model Application Publication No. S59(1984)-141405. Additionally, driving force calculator 191 compares a turning course that is predetermined in accordance with turning characteristics of vehicle 15, with an actual turning course that is calculated in accordance with the running conditions of vehicle 15. When there is a difference therebetween, driving force calculator 191 corrects the left and right driving forces, such as by temporarily making the driving force for the outer wheel of turning vehicle 15 larger than the driving force for the inner wheel thereof, so as to bring the actual turning course closer to the predetermined turning course, as disclosed in the above-mentioned Japanese Patent Application Publication No. H09(1997)-323561. Alternatively, driving force calculator 191 compares a turning course that is temporarily modified from the predetermined turning course in accordance with running environments, with an actual turning course that is calculated in accordance with the running conditions of vehicle 15. When there is a difference therebetween, driving force calculator 191 corrects the driving forces so as to bring the actual turning course closer to the modified turning course.

Figure 3:
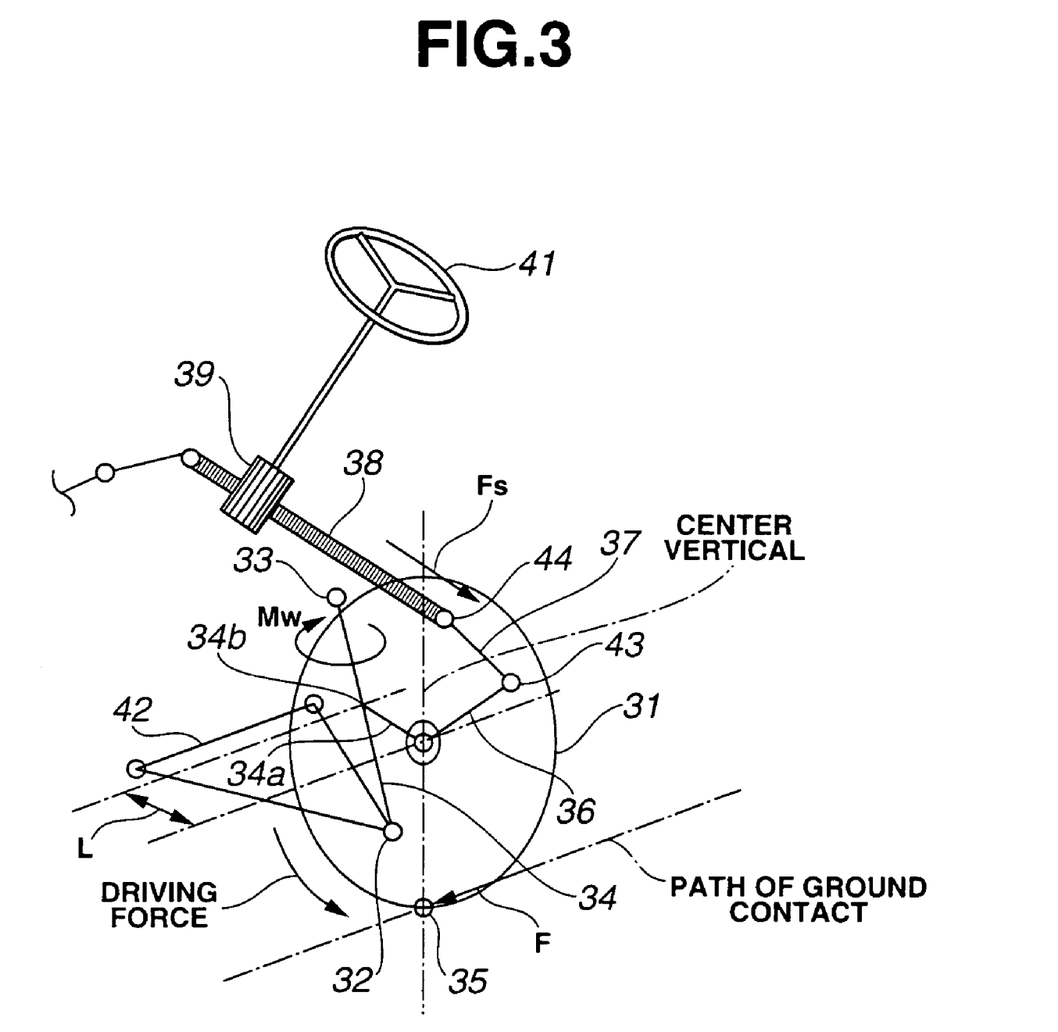
FIG. 3 is a diagrammatic perspective view showing a front wheel, a suspension mechanism and a steering mechanism of the steering apparatus of FIG. 1.
Figure 4:
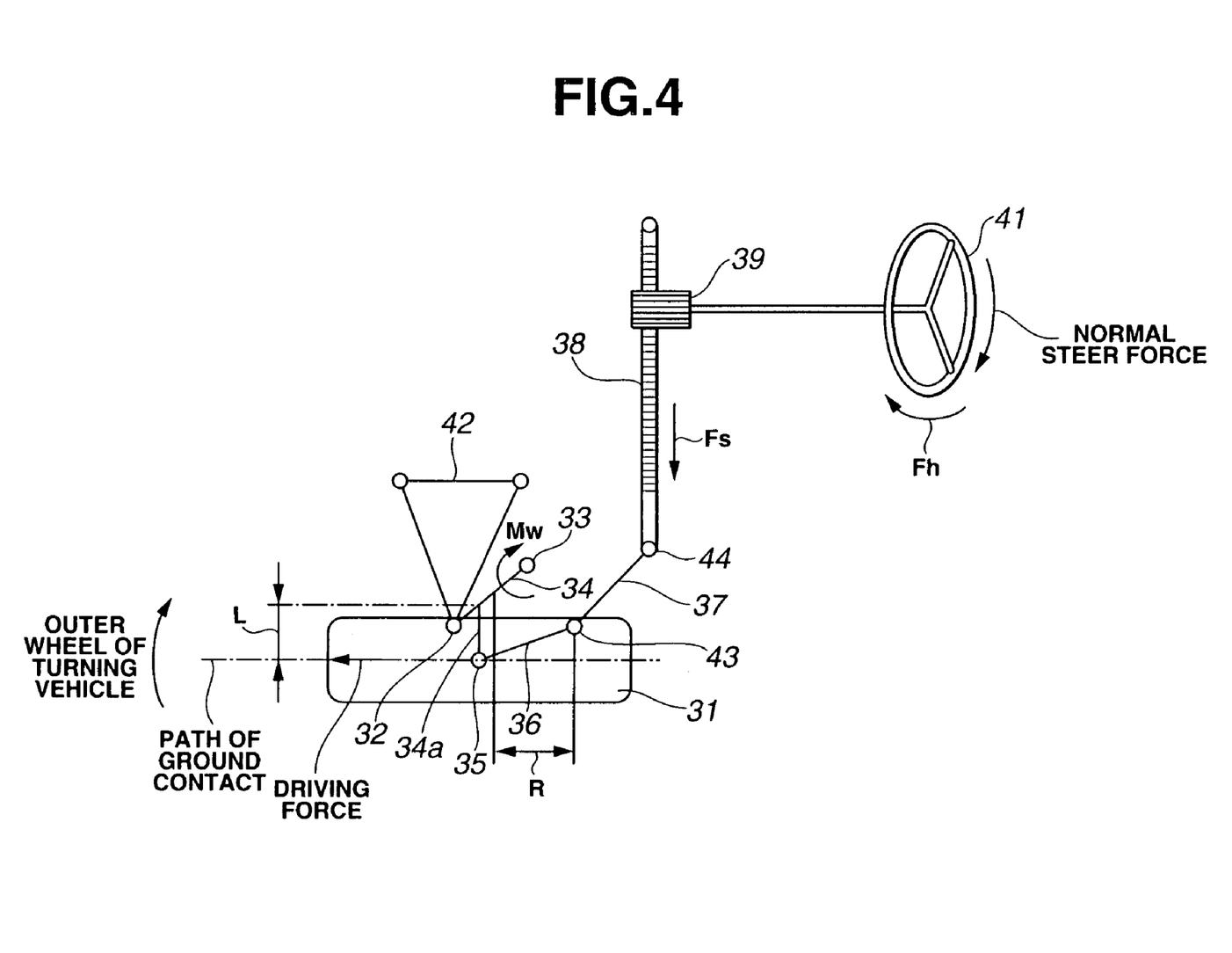
FIG. 4 is a diagrammatic plan view showing the front wheel, the suspension mechanism and the steering mechanism of FIG. 3.

Next, a description will be given in detail of relationship between the driving forces and the driver's steering input force as relevant to the present invention. FIG. 3 is a diagrammatic perspective view showing a steerable front drive wheel, a suspension mechanism suspending the front wheel, and a rack-and-pinion steering mechanism linking the front wheel with the steering wheel, as viewed obliquely from front and upward. FIG. 4 is a diagrammatic plan view showing the front wheel, the suspension mechanism, and the rack-and-pinion steering mechanism of FIG. 3. A front wheel 31 is turned around a virtual kingpin axis 34 passing through a lower ball joint 32 and an upper end 33 of a strut member. In this example, front wheel 31 is turned right as the outer wheel of the turning vehicle, i.e., the left wheel of the vehicle turning right. The axis of an axle 34a and virtual kingpin axis 34 cross each other at an intersection 34b located at a position offset from a ground contact point 35 by a distance L. Therefore, when a driving force acts on front wheel 31, a driving reaction force acts on front wheel 31 at ground contact point 35; and due to this driving reaction force, a bending moment Mw around virtual kingpin axis 34 acts on a knuckle arm 36 in proportion to distance L. The bending moment Mw is represented in the following expression, where F represents the driving reaction force acting on front wheel 31 at ground contact point 35.

$Mw = F \times L$

The bending moment Mw applies a rack axial force Fs via knuckle arm 36 and a side rod 37 to a steering rack 38 extending in the widthwise direction of the vehicle. Rack axial force Fs is represented in the following expression, where R represents a distance between virtual kingpin axis 34 and a point 43 linking knuckle arm 36 with side rod 37.

$Fs = Mw/R$

When there is a difference ΔF between driving forces of the left and right front wheels, a steering reaction force Fh acts on a steering wheel 41 in proportion to the left and right driving force difference ΔF. Steering reaction force Fh is represented in the following expression, where α represents a radius of a pinion 39 of the rack-and-pinion steering mechanism linking front wheel 31 with steering wheel 41, and β represents a radius of steering wheel 41.

$Fh = Fs \times \alpha/\beta$

When, for example, ΔF=50 kgf, L=10 mm, R=130 mm, α=10 mm, and β=180 mm, then the steering reaction force Fh becomes 0.2 kgf. That is, when only the driving force acting of front left wheel 31 is increased so that the driving force of front left wheel 31 is 50 kgf larger than the driving force acting on the front right wheel, then the steering reaction force Fh of 0.2 kgf acts in a clockwise direction corresponding to the right steering direction on steering wheel 41, as shown in FIG. 4. In this example, when the driver turns steering wheel 41 in the clockwise direction as shown by a thin line arrow in FIG. 4 to steer the vehicle rightward by inputting the clockwise steering force thereto, steering reaction force Fh acts on steering wheel 41 in the clockwise steering direction, and thereby makes the steering input force to be input by the driver too light.

During a cornering operation of the vehicle, the driver holds the steering wheel at a desired steering angle against the steering reaction force while receiving a lateral acceleration. In this course, an abrupt change of the steering force as described above may give the driver an unnatural drive feeling.

According to this embodiment of the present invention, the steering apparatus modifies the required steering force so as to make the steering operation heavier to prevent such an unnatural feeling. In an opposite case, when a steering reaction force acts in a counterclockwise direction corresponding to the left steering direction on steering wheel 41, and thereby makes the steering input force to be input by the driver too heavy, the steering apparatus modifies the required steering force so as to make the steering operation lighter to prevent such an unnatural feeling. This opposite case occurs because of a structural difference in the suspension mechanism, such as virtual kingpin axis 34 passing through outside a path of the ground contact point widthwise unlike the structure of FIGS. 3 and 4, or due to a driving reaction force acting on front wheel 31 in a direction opposite to the direction of driving reaction force F shown in FIG. 3. In either case, the steering apparatus modifies the required steering force to a value substantially equal to a required steering force that is assumed when there is no difference in the driving forces between the left and right wheels.

Figure 5:
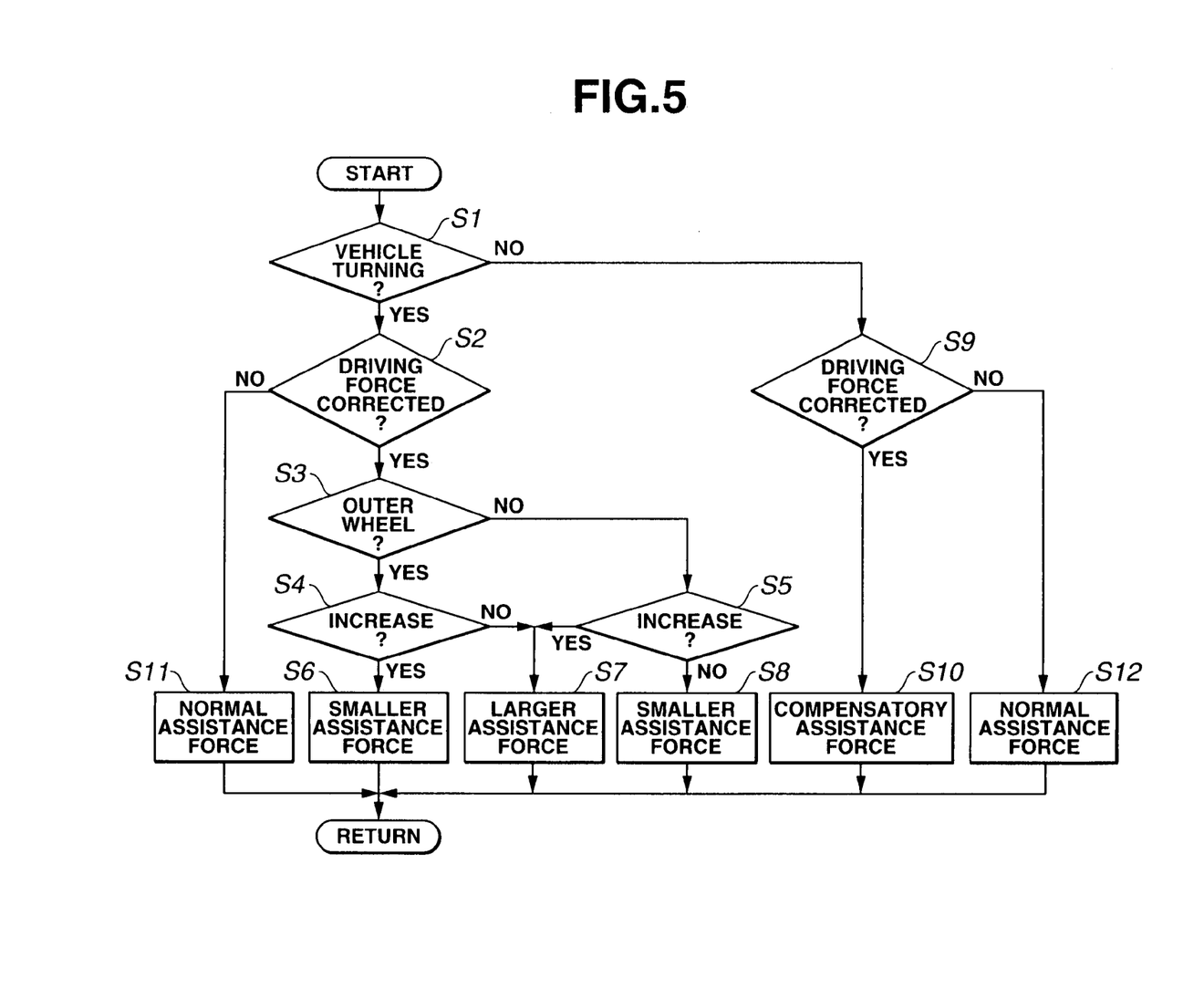
FIG. 5 is a flowchart of a control process performed by the steering apparatus of FIG. 1.

FIG. 5 shows a control process performed by the steering control section including steering assistance force calculator 192 and power assistance controller 194. In this example, the control process is performed as a timer interrupt at regular intervals of 10 ms. In step S1, steering assistance force calculator 192 examines the vehicle condition signals transmitted from vehicle condition calculator 21, and thereby determines whether or not vehicle 15 is turning. When steering assistance force calculator 192 judges that vehicle 15 is turning (YES in step S1), the routine of FIG. 5 proceeds to step S2. On the other hand, when steering assistance force calculator 192 judges that vehicle 15 is not turning, but is running substantially straight (NO in step S1), the routine of FIG. 5 proceeds to step S9.

In step S9, steering assistance force calculator 192 checks whether or not the driving force for the left/right wheel is corrected (increased or decreased) by driving force calculator 191. When driving force calculator 191 does not correct the driving force for the left/right wheel (NO in step S9), the routine of FIG. 5 proceeds to step S12. In step S12, the steering control section determines the steering assistance force in a normal mode without correction, and controls power assistance device 9 to provide steering mechanism 7 with a normal steering assistance force of the normal mode.

On the other hand, when driving force calculator 191 corrects (to either increase or decrease) the driving force for the left/right wheel (YES in step S9), the routine of FIG. 5 proceeds to step S10. In step S10, power assistance device 9 is controlled to provide steering mechanism 7 with a steering assistance force for compensating the steering reaction force so as to prevent undesired turning of front wheels 1 and 2.

As mentioned above, step S2 is reached when steering assistance force calculator 192 judges that vehicle 15 is turning (YES in step S1). In step S2, steering assistance force calculator 192 checks whether or not the driving force for the left/right wheel is corrected (increased or decreased) by driving force calculator 191. When driving force calculator 191 does not correct (to neither increase nor decrease) the driving force for the left/right wheel (NO in step S2), the routine of FIG. 5 proceeds to step S11. In step S11, the steering control section determines the steering assistance force in the normal mode without correction, and controls power assistance device 9 to provide steering mechanism 7 with a steering assistance force for the normal operation.

When, on the other hand, driving force calculator 191 corrects (to either increase or decrease) the driving force for the left/right wheel (YES in step S2), the routine of FIG. 5 proceeds from S2 to step S3. In step S3, steering assistance force calculator 192 checks whether driving force calculator 191 corrects (to either increase or decrease) the driving force for the outer wheel of the turning vehicle, i.e., the left wheel upon the vehicle turning right, or the right wheel upon the vehicle turning left, or does not correct (to either increase or decrease) the driving force for the outer wheel. When driving force calculator 191 corrects (to either increase or decrease) the driving force for the outer wheel (YES in step S3), the routine of FIG. 5 proceeds to step S4. When driving force calculator 191 does not correct (to neither increase nor decrease) the driving force for the outer wheel (NO in step S3), driving force calculator 191 corrects (to either increase or decrease) the driving force for the inner wheel of the turning vehicle, i.e., the right wheel upon the vehicle turning right, or the left wheel upon the vehicle turning left, and the routine of FIG. 5 proceeds to step S5.

In step S4, steering assistance force calculator 192 checks whether driving force calculator 191 increases or decreases the driving force for the outer wheel. When driving force calculator 191 increases the driving force for the outer wheel (YES in step S4), the routine of FIG. 5 proceeds to step S6. In step S6, the steering control section decreases the steering assistance force by an amount corresponding to the steering reaction force, and controls power assistance device 9 to provide steering mechanism 7 with a steering assistance force smaller than the normal steering assistance force. With this decreasing correction of the steering assistance force, the driver can turn the steering wheel to steer front wheels 1 and 2 with a steering input force substantially equal to a steering force normally required when there is no correction of the driving force.

When, on the other hand, driving force calculator 191 decreases the driving force for the outer wheel (NO in step S4), the routine of FIG. 5 proceeds from S4 to step S7. In step S7, the steering control section increases the steering assistance force by an amount corresponding to the steering reaction force acting to make the steering operation heavier, and controls power assistance device 9 to provide steering mechanism 7 with a steering assistance force greater than the normal steering assistance force. With this increasing correction of the steering assistance force, the driver can turn the steering wheel to steer front wheels 1 and 2 with a steering input force substantially equal to a steering force normally required when there is no correction of the driving force.

Step S5 is reached in the case of negative answer of S3. In step S5, steering assistance force calculator 192 checks whether driving force calculator 191 increases or decreases the driving force for the inner wheel. When driving force calculator 191 increases the driving force for the inner wheel (YES in step S5), the routine proceeds to step S7, and the steering control section increases the steering assistance force as mentioned before.

When driving force calculator 191 decreases the driving force for the inner wheel (NO in step S5), the routine proceeds to step S8. In step S8, the steering control section decreases the steering assistance force by an amount corresponding to the steering reaction force, as in step S6, and thereby controls power assistance device 9 to provide steering mechanism 7 with a steering assistance force smaller than the normal steering assistance force. With this decreasing correction of the steering assistance force, the driver can turn the steering wheel to steer front wheels 1 and 2 with a steering input force substantially equal to a steering force normally required when there is no correction of the driving force.

Figure 6:
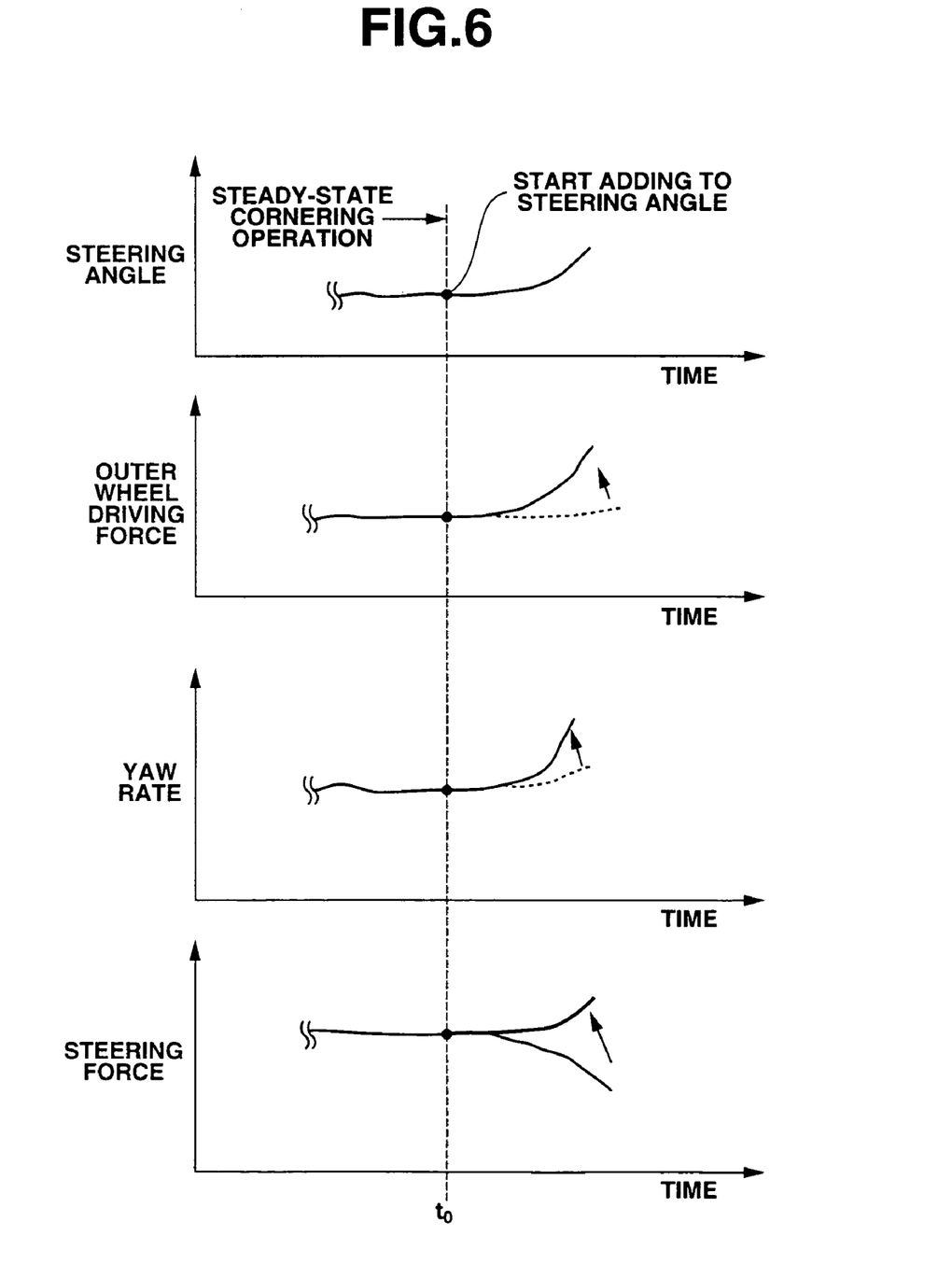
FIG. 6 shows time charts illustrating effects exhibited by the steering apparatus of FIG. 1.

FIG. 6 illustrates effects exhibited by the steering apparatus according to the present embodiment, in the form of time charts of the steering angle, the driving force for the outer wheel, the yaw rate, and the driver's steering input force. In an example of FIG. 6, solid thick and thin lines indicate characteristics in the state in which the driving force for the outer wheel of the turning vehicle is increased, and dotted lines comparatively indicate characteristics in the normal vehicle running state in which the driving force for the outer wheel is not increased.

In the example of FIG. 6, during a substantially steady-state cornering operation of vehicle 15 in a circle by keeping steering wheel 11 at a constant steering angle, the driver starts turning steering wheel 11 further in the steering direction, to add to the steering angle at a time t0 indicated by a vertical dashed line in FIG. 6. In this case, control unit 19 increases the driving force for the outer wheel above the level of the normal mode, to improve the yawing response of the vehicle, and thereby causes a driving force difference between the outer and inner wheels. As a result, the yawing response is improved as intended, and the yaw rate increases as compared to the dotted line in FIG. 6.

When the yawing response is improved vehicle 15 by the driving force difference between the outer and inner wheels, however, steering rack 8 is applied with an axial force which causes a steering reaction force acting on steering wheel 11 in the same steering direction as the driver's steering input force to make light the steering force to be input by the driver, as shown in FIGS. 3 and 4. In this course, if there is no correction performed for the driver's steering input force, the driver's steering input force becomes smaller as the steering angle is made larger, as indicated by the thin line in FIG. 6. This decrease of driver's steering input force may deteriorate the steering feeling by making the driver feel uneasy, and thereby cause adverse influence the vehicle safety.

According to the present embodiment, by contrast, steering assistance force calculator 192, as a steering reaction force calculating section, calculates steering reaction force Fh based on the left and right driving force difference ΔF to correct the required steering force to be input by the driver so as to compensate steering reaction force Fh; and power assistance controller 194, as a steering force correcting section, controls power assistance device 9 to provide rack-and-pinion steering mechanism 7 with an increased or decreased steering assistance force so that the driver is able to turn front wheels 1 and 2 by inputting an adequate steering input force to steering wheel 11. As shown by the thick line in FIG. 6., the driver's steering input force becomes greater as the steering angle is made larger, This increasing driver's steering input force gives the driver the same steering feeling as when turning the vehicle in the normal state. Therefore, this control system can improve the cornering characteristic and cornering stability both to a higher level.

Figure 7:
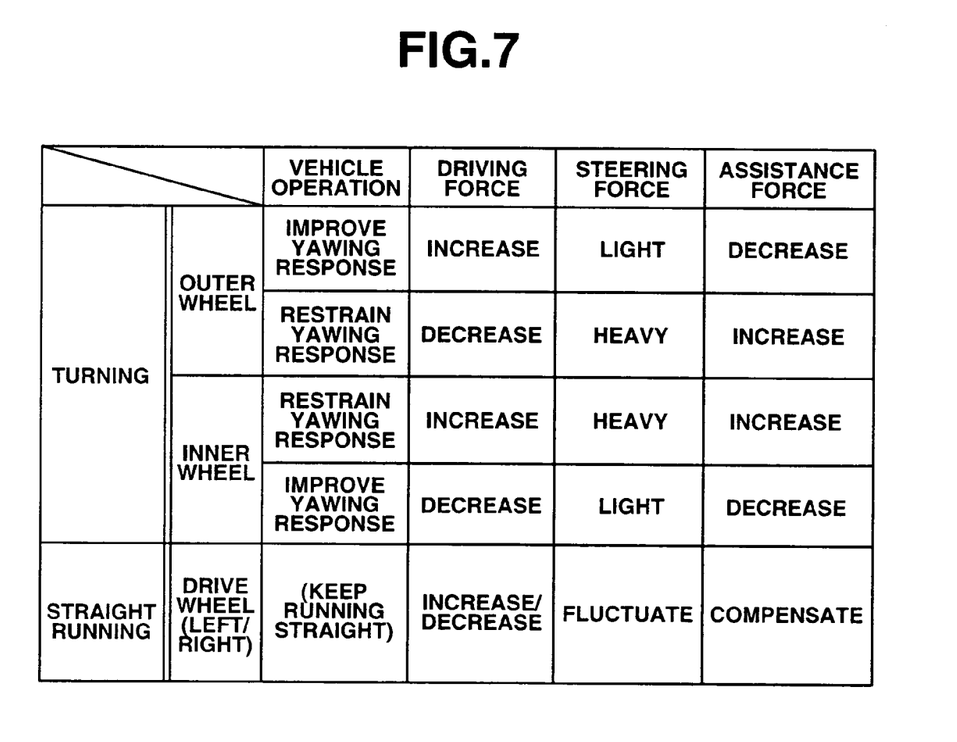
FIG. 7 is a table showing corrections for a driving force and a driver's steering input force controlled by the steering apparatus of FIG. 1.

Besides, although the driving force for the outer wheel of the turning vehicle is increased in the example of FIG. 6, the driving force for the inner wheel of the turning vehicle may be increased or decreased to provide substantially the same effects, as shown in FIG. 7.

When, as shown in FIG. 7, the driving force for the outer wheel is made greater than the normal state to improve the yawing response, the steering wheel become too light by the effect of the steering reaction force due to the left and right driving force difference between the outer and inner wheels, as described above with reference to FIGS. 3 and 4. In this case, the steering apparatus or steering control system of this embodiment reduces the steering assistance force of power assistance device 9, as in step S6 of FIG. 5, and thereby corrects the required steering force to the level of the steering force in the normal driving operation with no left and driving force difference.

When the driving force for the outer wheel is made smaller than the normal state to restrain the yawing response, the steering wheel become too heavy. In this case, the steering apparatus or steering control system of this embodiment increases the steering assistance force of power assistance device 9, as in step S7 of FIG. 5, and thereby corrects the required steering force to a level of the steering force in the normal driving operation with no left and driving force difference.

When the driving force for the inner wheel is made greater than the normal state to restrain the yawing response, the steering wheel become too heavy by the effect of the steering reaction force due to the left and right driving force difference between the outer and inner wheels. In this case, the steering apparatus or steering control system of this embodiment increases the steering assistance force of power assistance device 9, as in step S7, and thereby corrects the required steering force to the level of the steering force in the normal driving operation with no left and driving force difference.

When the driving force for the outer wheel is decreased to improve the yawing response, the steering wheel become too light. In this case, the steering apparatus or steering control system of this embodiment decreases the steering assistance force of power assistance device 9, as in step S8, and thereby corrects the required steering force to the level of the steering force in the normal driving operation with no left and driving force difference.

When the vehicle is being turned, the load on the inner wheel is decreased by the effect of rolling motion of the vehicle. Therefore, in general, the control of increasing or decreasing the driving force for the outer wheel is more effective than the control of increasing or decreasing the driving force for the inner wheel. However, when a road is slippery partly, for example, the driving force for the inner wheel can be increased or decreased without causing a sharp change in the driving force so that the vehicle can be turned stably.

Besides, the steering apparatus according to the present embodiment is effective not only in the turning operation but in the straight ahead running operation as well. When, for example, the driving force for only one of the left and right wheels is increased or decreased to negotiate a bump on a road (and hence the answer of S9 is affirmative), the steering apparatus or steering control system corrects the steering assistance force to a greater value or to a smaller value so as to compensate the steering reaction force in accordance with the increased or decreased driving force, as in step S10 of FIG. 5. With this compensatory steering assistance force, the steering apparatus can avoid a change of the driver's steering input force, and thereby prevent unstable fluctuation of the steering wheel. Additionally, the compensatory steering assistance force acts to prevent an undesired turning of front wheels 1 and 2 due to the bending moment Mw, and frees the driver from a burden of holding the steering wheel by performing an undesired steering operation to keep the vehicle running substantially straight.

Next, a description will be given of another example of the control process performed by the steering control section of steering assistance force calculator 192 and power assistance controller 194 according to the present invention. When a vehicle is designed to exhibit a running performance such as of a sports car, the vehicle is provided with a turning characteristic of slightly intense understeer setting. However, depending on running conditions of the vehicle, the turning characteristic may be changed temporarily from the understeer setting to a neutral steer setting to give a better drive feeling. Specifically, during a cornering operation of the vehicle in a predetermined turning course, the driver may direct the vehicle to be turned around in a smaller turning radius by turning the steering wheel further in the steering direction. In such a case, the steering apparatus can temporarily change the turning characteristic from the understeer setting to the neutral steer setting by increasing the driving force for the outer wheel, to give a better drive feeling.

When a vehicle is designed to exhibit a running performance such as of a family car suited to turn in a small radius, the vehicle is provided with a turning characteristic of slightly oversteer setting so that the vehicle can be turned easily when parking or driving in town. However, on a winding road, the oversteer setting is undesirable in some cases because of such a slightly excessive yawing response as to require driver's frequent steering adjustment and hence to cause driver's feeling of tiredness. In such a case, the temporary change of turning characteristic from the oversteer setting to a neutral steer setting is preferable. Therefore, depending on such running conditions of the vehicle, the steering apparatus can provide better driver feeling by decreasing the driving force for the outer wheel, and thereby decreasing the yawing response.

However, the temporary change of the turning characteristic to the neutral steer setting by increasing or decreasing the driving force for the left or right wheel as shown in FIG. 7 causes a steering reaction force. This steering reaction force changes the driver's steering input force as described above with reference to FIGS. 3 and 4, and imposes a burden of steering operation on the driver.

In the present embodiment, when driving force calculator 191 increases or decreases the driving force for the left or right wheel to temporarily change the turning characteristic of vehicle 15 in accordance with a running environment of vehicle 15, steering assistance force calculator 192 compensates the resulting steering reaction force by increasing or decreasing the steering assistance force of power assistance device 9.

This increased or decreased steering assistance force enables the driver to drive the vehicle easily in accordance with running conditions, even on a winding road, by inputting substantially the same steering force as in the normal state. Therefore, this steering apparatus can improve the cornering characteristic and the steering feeling simultaneously.

In the illustrated embodiment, the vehicle is a 2WD vehicle having the front drive wheels 1 and 2, and the rear non-drive wheels 3 and 4. However, the present invention is applicable to a 4WD vehicle or an all-wheel-drive vehicle as long as there are a pair of independently driven left and right steerable wheels.

Additionally, the present invention is applicable to vehicles having various other drive systems such as a drive system employing hydraulic motors instead of driving motors 17 and 18.

According to another aspect of the present invention, the steering apparatus comprises: means (191, 193) for controlling left and right driving forces of left and right drive wheels individually in accordance with a running condition of the vehicle; means (192) for calculating a steering reaction force acting on a steering input device in accordance with a left and right driving force difference between the left and right driving forces; and means (194) for varying a steering assistance force so as to compensate the steering reaction force.

This application is based on a prior Japanese Patent Application No. 2003-147648 filed on May 26, 2003. The entire contents of this Japanese Patent Application No. 2003-147648 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering apparatus for controlling left and right drive wheels of a vehicle, comprising:
   a driving force control section to control left and right driving forces of the left and right drive wheels individually in accordance with a running condition of the vehicle;
   a power assistance device to add a steering assistance force to a driver's steering input force input to a steering input device;
   a steering mechanism to link the left and right drive wheels with the steering input device so that the left and right drive wheels are turned in accordance with the driver's steering input force and the steering assistance force added thereto;
   a steering reaction force calculating section to calculate a steering reaction force acting on the steering input device in accordance with a difference between the left and right driving forces; and
   a steering force correcting section to correct the steering assistance force so as to compensate the steering reaction force by varying the steering assistance force in accordance with a turning direction of the vehicle,
   wherein the steering force correcting section is configured to decrease the steering assistance force when the driving force control section controls the left and right driving forces of the left and right drive wheels in a direction to improve a yawing response of the vehicle, and to increase the steering assistance force when the driving force control section controls the left and right driving forces of the left and right drive wheels in a direction to restrain the yawing response of the vehicle.

2. The steering apparatus as claimed in claim 1, wherein the steering force correcting section corrects a magnitude of the steering assistance force so as to compensate the steering reaction force when the driving force control section corrects a magnitude of the driving force of one of the left and right drive wheels when the vehicle is running substantially straight.

3. The steering apparatus as claimed in claim 1, wherein the steering force correcting section corrects a magnitude of the steering assistance force so as to compensate the steering reaction force when the driving force control section corrects a magnitude of the driving force of at least one of the left and right drive wheels in accordance with a running environment of the vehicle.

4. The steering apparatus as claimed in claim 1, wherein the driving force control section includes a left wheel motor to drive the left drive wheel to drive the vehicle, and a right wheel motor to drive the right drive wheel to drive the vehicle.

5. The steering apparatus as claimed in claim 1, wherein the steering reaction force calculating section is configured to calculate the steering reaction force in accordance with the difference between the let and right driving forces so that the steering reaction force is proportional to the difference between the left and right driving forces.

6. The steering apparatus as claimed in claim 1, wherein the steering force correcting section is connected with the power assistance device, and configured to control the power assisting device to correct the steering assisting force of the power assistance device.

7. A steering apparatus for controlling left and right drive wheels of a vehicle, comprising:
- a driving force control section to control left and right driving forces of the left and right drive wheels individually in accordance with a running condition of the vehicle;
- a power assistance device to add a steering assistance force to a driver's steering input force input to a steering input device;
- a steering mechanism to link the left and right drive wheels with the steering input device so that the left and right drive wheels are turned in accordance with the driver's steering input force and the steering assistance force added thereto;
- a steering reaction force calculating section to calculate a steering reaction force acting on the steering input device in accordance with a difference between the left and right driving forces; and
- a steering force correcting section to correct the steering assistance force so as to compensate the steering reaction force,
- wherein the steering force correcting section decreases the steering assistance force when the driving force control section increases the driving force of an outer drive wheel of the drive wheels outside of a turning radius of the vehicle, and
- wherein the steering force correcting section is configured to decrease the steering assistance force when the driving force control section controls the left and right driving forces of the left and right drive wheels in a direction to improve a yawing response of the vehicle, and to increase the steering assistance force when the driving force control section controls the left and right driving forces of the left and right drive wheels in a direction to restrain the yawing response of the vehicle.

8. A steering apparatus for controlling left and right drive wheels of a vehicle, comprising:
- a driving force control section to control left and right driving forces of the left and right drive wheels individually in accordance with a running condition of the vehicle;
- a power assistance device to add a steering assistance force to a driver's steering input force input to a steering input device;
- a steering mechanism to link the left and right drive wheels with the steering input device so that the left and right drive wheels are turned in accordance with the driver's steering input force and the steering assistance force added thereto;
- a steering reaction force calculating section to calculate a steering reaction force acting on the steering input device in accordance with a difference between the left and right driving forces; and
- a steering force correcting section to correct the steering assistance force so as to compensate the steering reaction force,
- wherein the steering force correcting section increases the steering assistance force when the driving force control section decreases the driving force of an outer drive wheel of the drive wheels outside of a turning radius of the vehicle, and
- wherein the steering force correcting section is configured to decrease the steering assistance force when the driving force control section controls the left and right driving forces of the left and right drive wheels in a direction to improve a yawing response of the vehicle, and to increase the steering assistance force when the driving force control section controls the left and right driving forces of the left and right drive wheels in a direction to restrain the yawing response of the vehicle.

9. A steering apparatus for controlling left and right drive wheels of a vehicle, comprising:
- a driving force control section to control left and right driving forces of the left and right drive wheels individually in accordance with a running condition of the vehicle;
- a power assistance device to add a steering assistance force to a driver's steering input force input to a steering input device;
- a steering mechanism to link the left and right drive wheels with the steering input device so that the left and right drive wheels are turned in accordance with the driver's steering input force and the steering assistance force added thereto;
- a steering reaction force calculating section to calculate a steering reaction force acting on the steering input device in accordance with a difference between the left and right driving forces; and
- a steering force correcting section to correct the steering assistance force so as to compensate the steering reaction force,
- wherein the steering force correcting section increases the steering assistance force when the driving force control section increases the driving force of an inner drive wheel of the drive wheels inside of a turning radius of the vehicle, and
- wherein the steering force correcting section is configured to decrease the steering assistance force when the driving force control section controls the left and right driving forces of the left and right drive wheels in a direction to improve a yawing response of the vehicle, and to increase the steering assistance force when the driving force control section controls the left and right driving forces of the left and right drive wheels in a direction to restrain the yawing response of the vehicle.

10. A steering apparatus for controlling left and right drive wheels of a vehicle, comprising:
- a driving force control section to control left and right driving forces of the left and right drive wheels individually in accordance with a running condition of the vehicle;
- a power assistance device to add a steering assistance force to a driver's steering input force input to a steering input device;
- a steering mechanism to link the left and right drive wheels with the steering input device so that the left and right drive wheels are turned in accordance with the driver's steering input force and the steering assistance force added thereto;

a steering reaction force calculating section to calculate a steering reaction force acting on the steering input device in accordance with a difference between the left and right driving forces; and a steering force correcting section to correct the steering assistance force so as to compensate the steering reaction force, wherein the steering force correcting section decreases the steering assistance force when the driving force control section decreases the driving force of an inner drive wheel of the drive wheels inside of a turning radius of the vehicle, and wherein the steering force correcting section is configured to decrease the steering assistance force when the driving force control section controls the left and right driving forces of the left and right drive wheels in a direction to improve a yawing response of the vehicle, and to increase the steering assistance force when the driving force control section controls the left and right driving forces of the left and right drive wheels in a direction to restrain the yawing response of the vehicle.

11. A steering process for controlling left and right steerable drive wheels of a vehicle, comprising:

controlling left and right driving forces of the left and right steerable drive wheels individually in accordance with a running condition of the vehicle, examining a difference between the left and right driving forces individually controlled for the left and right steerable drive wheels turned in accordance with a driver's steering input force input to a steering input device and a steering assistance force added to the driver's steering input force;

calculating a steering reaction force acting on the steering input device in accordance with a difference between the left and right driving forces;

varying the steering assistance force so as to compensate the steering reaction force acting on the steering input device in accordance with the difference between the left and right driving forces when the driving force of one of an outer drive wheel of the steerable drive wheels outside of a turning radius of the vehicle and an inner drive wheel of the steerable drive wheels inside of the turning radius of the vehicle is varied; and decreasing the steering assistance force when the steering assistance force is varied so that the left and right driving forces of the left and right steerable drive wheels are controlled in a direction to improve a yawing response of the vehicle, and increasing the steering assistance force when the steering assistance force is varied so that the left and right steerable driving forces of the left and right drive wheels are controlled in a direction to restrain the yawing response of the vehicle.

12. A steering apparatus for controlling left and right steerable drive wheels of a vehicle, comprising:

means for controlling left and right driving forces of the left and right drive wheels individually in accordance with a running condition of the vehicle;

means for calculating a steering reaction force caused in a steering input device by a left and right driving force difference between the left and right driving forces; and means for varying a steering assistance force so as to compensate the steering reaction force, wherein the means for varying the steering assistance force is configured to decrease the steering assistance force when the means for controlling left and right driving forces controls the left and right driving forces of the left and right drive wheels in a direction to improve a yawing response of the vehicle, and to increase the steering assistance force when the means for controlling left and right driving forces controls the left and right driving forces of the left and right drive wheels in a direction to restrain the yawing response of the vehicle.

13. The steering apparatus as claimed in claim 12, wherein the means for controlling left and right driving forces includes left wheel drive means for driving the left drive wheel to drive the vehicle, and right wheel drive means for driving the right drive wheel to drive the vehicle.

* * * * *